Oct. 14, 1924.
H. D. JAMES
SYSTEM OF CONTROL
Filed Aug. 30, 1920
1,511,343
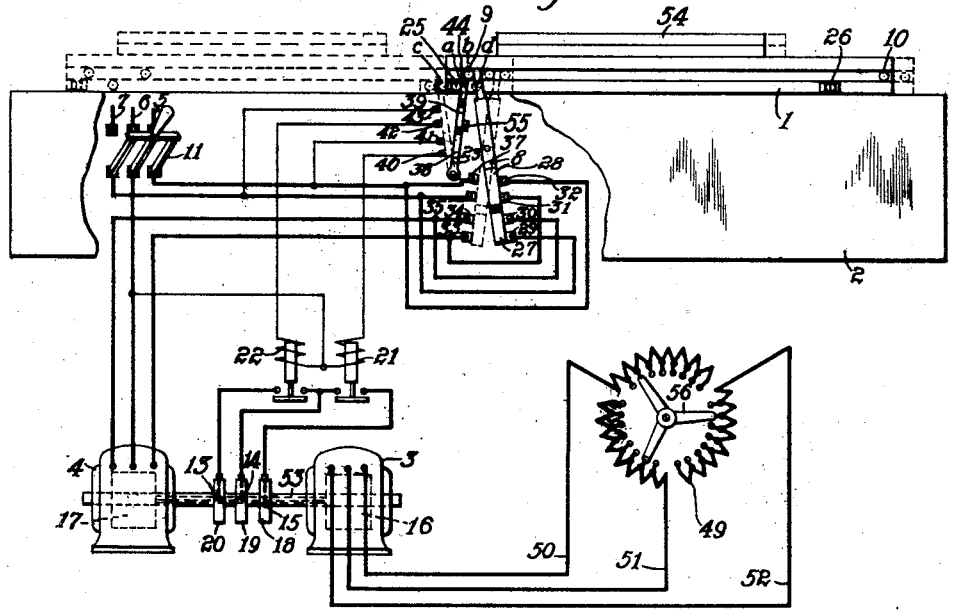
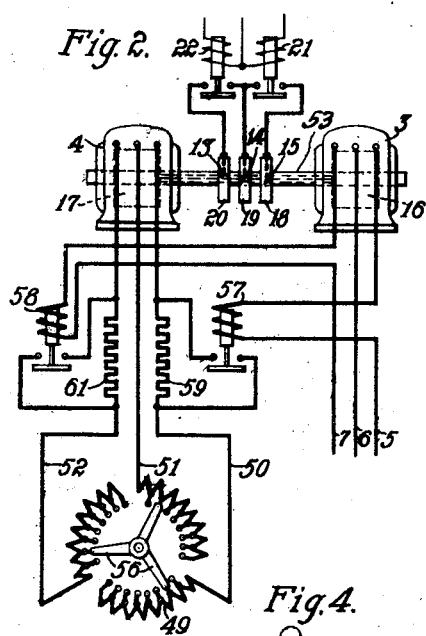
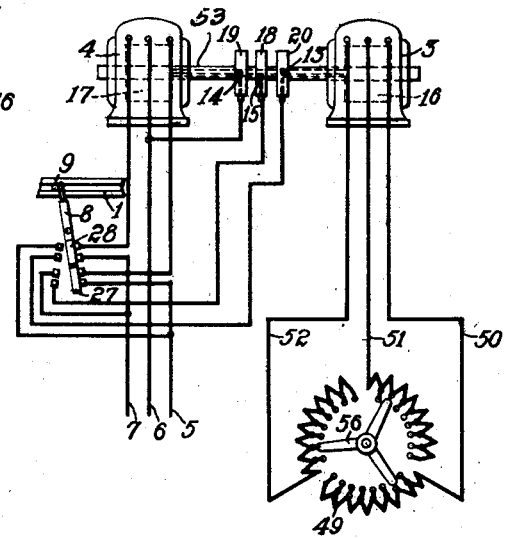
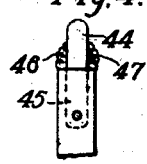
WITNESSES:
INVENTOR
Henry D. James
BY
ATTORNEY Patented Oct. 14, 1924.

1,511,343

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed August 30, 1920. Serial No. 406,849.

*To all whom it may concern:*

Be it known that I, HENRY D. JAMES, a citizen of the United States, and a resident of Edgewood Park, in the county of Allegheny and State of Pennsylvania, have invented a new and useful Improvement in Systems of Control, of which the following is a specification.

My invention relates to motor control systems and particularly to such systems as are employed in connection with alternating current motors for driving planers or other reciprocating tools.

The object of my invention is to provide a motor control system of the above indicated character whereby a pair of alternating current motors may be employed for driving planer tables or other reciprocating machines.

The present practice in operating machines comprising reversing motors, such as planers and other machines having reciprocating parts, is to employ direct current systems of control. In localities where only alternating current is available, the direct current system of drive requires the use of a motor-generator set or other converting means for changing the alternating current to direct current.

According to my invention, I provide a system of control whereby planers or other machines embodying reversing motors may be driven by means of alternating current motors.

During each complete cycle of operation in the system of planer control embodying my invention, the planer table moves through a cutting stroke and a return stroke. In order to provide a means for driving the planer table at relatively low speed during the cutting stroke, I provide means for connecting the driving motors in cascade relation.

In one system of control embodying my invention, the motion of the table is accelerated during the return stroke by operating a single motor as an induction motor. In a modification, the motion of the table is accelerated by connecting the main supply leads directly to the slip rings common to the pair of driving motors. The direction of rotation of the motors is reversed at the end of each stroke by means of a table-operated switch.

Where the cutting is intermittent such as in planing pads on a bed plate, there will be a tendency for the motors to speed up between cuts. This tendency of the motors to speed up is taken care of in my invention by automatically inserting resistance in the rotor circuit of one of the motors by means of an overload relay.

My invention may be best understood by reference to the accompanying drawings, in which—

Fig. 1 is a diagrammatic view of circuits and apparatus embodying my invention.

Fig. 2 is a schematic diagram of a part of the control system shown in Fig. 1, with the addition of an underload relay circuit.

Fig. 3 is a schematic diagram of an alternate arrangement of primary circuits to that shown in Fig. 1.

Fig. 4 is a side elevational view of a section of the switch arm shown in Fig. 1 for controlling the operation of the relays.

Referring particularly to Fig. 1, a reciprocating planer table 1 mounted on a base 2 is actuated by means of motors 3 and 4. The motors 3 and 4 are in turn connected to a source of energy 5, 6 and 7 through a reversing switch 8 actuated by projecting lugs 9 and 10 that are adjustably secured to the planer table 1 and through a manually-operable switch 11.

Conductors 13, 14 and 15 connect the rotors 16 and 17. Slip rings 18, 19 and 20 are connected respectively to conductors 13, 14 and 15. Relays 21 and 22 control the operation of motors 3 and 4. The actuating windings of relays 21 and 22 are controlled by a switch 23 that is actuated by projecting lugs 25 and 26, adjustably mounted on the planer table 1.

Contact segments 27 and 28 of switch 8 engage pairs of contact members 29, 30 and 31, 32 respectively, when the planer table is in one extreme position, and pairs of contact members 33, 34 and 35, 37, respectively, when the planer table is in the other extreme position.

The contact segments 38 and 39 of switch 23 are actuated into engagement with pairs of contact members 40, 41 and 42, 43, respectively, during the first part of the return stroke of the planer table 1.

In Fig. 4, is shown the detailed construction of a section of the switch 23 that is engaged successively by the projecting lugs 25 and 26. A projecting arm 44 is pivotally mounted on a main arm 45 of switch 23. Movement of the arm 44 relatively to the arm 45 is resisted by the force of springs 46 and 47. The strengths of the springs are such as to cause the arm 45 to be actuated from either of its positions to the other by the arm 44 before the springs yield to permit a coacting member to pass over the arm 44.

An adjustable resistor 49 is electrically connected by conductors 50, 51 and 52 to the secondary winding of motor 3. The rotors 16 and 17 are, for convenience, shown as mounted upon the same shaft 53. The slip rings 18, 19 and 20 are rigidly mounted on the shaft 53. A piece of material 54, to be planed, is adjustably mounted on the planer table 1.

The operation of the system is as follows: Assuming the motors 3 and 4 are stationary and connected in cascade relation as indicated in Fig. 1, table 1 is near the end of its cutting stroke. To start the motors, a switch 11 is closed to complete a circuit which extends from line conductors 5, 6 and 7 through switch 11, contact members 29, 30 and 31, 32 and contact segments 27 and 28, respectively, of switch 8 to the primary winding of motor 4.

As the planer table is actuated from position a to position b, the projecting lug 9 actuates the contact segments 27 and 28 out of engagement with pairs of contact members 29, 30 and 31, 32, respectively, and into engagement with pairs of contact members 33, 34, and 35, 37, respectively, thus reversing the direction of the current through motors 3 and 4, and, as a result, their direction of rotation.

During the movement of the planer table in the latter portion of its cutting stroke, the projecting lug 25 engages the resiliently mounted arm 44 of the switch 23. Movement of the switch 23 in the direction of motion of the planer table is limited by the stop member 55. By reason of the fact that the projecting arm 44 is pivotally connected to the main arm 45 of the switch 23, the projecting lug 25 is permitted to pass over the projecting member 44. The projecting member 44 is returned to the initial position by the force of the springs 46 and 47.

The direction of the current through the motors 3 and 4 having been reversed by the movement of the switch 8, the planer table starts on its return stroke. During the first portion of the return stroke, the projecting lug 25 actuates the switch arm 23 into engagement with pairs of contact members 40, 41 and 42, 43, thus closing the circuit of the actuating coils of relays 21 and 22. Slip rings 18, 19 and 20 are shunted by relays 21 and 22.

The effect of short-circuiting the electrical connections between motors 3 and 4 is to cause motor 4 to operate similarly to a squirrel-cage induction motor at substantially double the previous operating speed. With the short-circuiting of the electrical connections between motors 3 and 4, motor 3 becomes inoperative by reason of the fact that no energy is supplied to that motor.

The planer table continues to move at the accelerated speed until the projecting lug 10 actuates contact segments 27 and 28 of switch 8 out of engagement with pairs of contact members 33, 34 and 35, 37, respectively, and into engagement with contact members 29, 30, and 31, 32, respectively, thereby reversing the direction of the current through the motor 4. The effect of reversing the direction of the current through the motor 4 is to bring the planer table 1 to a stop and to actuate it in reverse direction.

During the movement of the planer table in the latter portion of the return stroke, projecting lug 26 is permitted to pass the resiliently mounted member 44 of the switch 23, as hereinbefore explained. The movement of the switch arm 23 in the direction of motion of the planer table is limited by the contact members 40, 41 and 42, 43.

As the planer table starts on its cutting stroke, the projecting lug 26 engages the resiliently mounted arm 44 of the switch 23 and actuates contact segments 38 and 39 out of engagement with the pairs of contact members 40, 41 and 42, 43, respectively. The effect of opening the circuit of the actuating windings of relays 21 and 22 is to break the shunt connection across the slip rings 18, 19 and 20, and, as a result, permitting the motors to operate in cascade relation. The motors then continue to operate in cascade relation until the closing of the actuating winding of relays 21 and 22, during the first portion of the return stroke. A complete cycle of operation is completed with the return of planer table 1 to position a.

The adjustable rheostat 49 may be used to increase the speed of the driving motors 3 and 4 during their operation in cascade relation by moving a rheostat arm 56 in a counter clockwise direction. The resistance in the rotor circuit is thus decreased, with the result that there is a corresponding increase in the speed of the driving motors 3 and 4.

Referring to Fig. 2, the control system here shown differs from that of Fig. 1 in the addition of underload relays 57 and 58 for shunting resistors 59 and 61, respectively. Assuming the load on the planer motors to vary intermittently during the cutting stroke, from a minimum to a maximum value, the speed of the driving will be maintained substantially constant by the action of the relays 57 and 58 in inserting and shunting resistors 59 and 61 in the rotor circuit of motor 3.

Referring to Fig. 3, the system of control here shown differs from that of Fig. 1 in the arrangement of the primary circuits for reversing the direction of the rotation of the motors and accelerating the motors during the return stroke.

In this system of control, the relays 21 and 22 are omitted, the motors being accelerated on the return stroke by connecting the mail supply conductors 5, 6 and 7 directly to the slip rings 18, 19 and 20. During the cutting stroke, the supply conductors 5, 6 and 7 are connected directly to the terminals of motor 4 through switch 8. The switch 8, therefore, in this system of control, controls both the acceleration and reversing of the driving motors.

While I have shown a switching device of a particular construction in the control system which embodies my invention, it will be apparent to one versed in the art that a number of different switching devices may be employed without departing from the spirit of my invention.

I claim as my invention:

1. In a planer or the like, the combination with a reciprocating table, of driving means therefor comprising a plurality of alternating current motors, means for connecting said motors in cascade relation during one portion of a predetermined cycle, and means for periodically short-circuiting said cascade connections.

2. In a planer or the like, the combination with a reciprocating table, having a working stroke, of driving means therefor comprising a plurality of alternating current motors, means for connecting said motors in cascade relation during the working stroke and a predetermined portion of the return stroke, and means for shunting said cascade connection during the remaining portion of said return stroke.

3. In a planer or the like, the combination with a reciprocating table, of driving means therefor comprising a pair of alternating current motors, each motor having a primary and secondary winding, and switching means for connecting said windings in cascade relation during one portion of a predetermined cycle and shunting said cascade relation during the remaining portion of said predetermined cycle.

4. In a planer or the like, the combination with a reciprocating table, of driving means therefor comprising a pair of alternating current motors, each motor having a primary and a secondary winding, and switching means whereby said motors may be operated in cascade relation during one portion of a predetermined cycle and one of said motors operated as an induction motor with a short-circuited secondary member during the remaining portion of said predetermined cycle.

5. In a planer or the like, the combination with a reciprocating table having a cutting stroke and a return stroke, of driving means therefor comprising a plurality of alternating current motors, means for operating said motors according to a predetermined cycle, and means responsive to the load on said motors for automatically maintaining the speed of said motors substantially constant during the cutting stroke.

6. A system of planer control comprising a source of alternating current, a pair of alternating current motors each having a primary and a secondary winding, automatic switching means for connecting said motors in cascade relation during one portion of a predetermined cycle, and for rendering one of said motors ineffective during the remaining portion of said predetermined cycle, means responsive to the load on said motors for automatically maintaining the speed of said motors substantially constant during one portion of said predetermined cycle, and an adjustable resistor for regulating the speed of said motors during the cascade connections.

In testimony whereof, I have hereunto subscribed my name this 11th day of August 1920.

HENRY D. JAMES.